(12) United States Patent
Sotowa et al.

(10) Patent No.: US 8,790,824 B2
(45) Date of Patent: Jul. 29, 2014

(54) GRAPHITE ANODE ACTIVE MATERIAL FOR USE IN LITHIUM SECONDARY BATTERY

(75) Inventors: Chiaki Sotowa, Tokyo (JP); Takahiro Tamura, Tokyo (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 13/814,145

(22) PCT Filed: Aug. 5, 2011

(86) PCT No.: PCT/JP2011/004453
§ 371 (c)(1),
(2), (4) Date: Feb. 4, 2013

(87) PCT Pub. No.: WO2012/017676
PCT Pub. Date: Feb. 9, 2012

(65) Prior Publication Data
US 2013/0130127 A1    May 23, 2013

(30) Foreign Application Priority Data

Aug. 5, 2010  (JP) ................................. 2010-176783

(51) Int. Cl.
*H01M 4/02*    (2006.01)
(52) U.S. Cl.
USPC ........................................................ 429/209
(58) Field of Classification Search
None
See application file for complete search history.

(56) References Cited

U.S. PATENT DOCUMENTS

| | | | | |
|---|---|---|---|---|
| 5,491,041 A | * | 2/1996 | Abraham et al. | 429/212 |
| 2002/0197534 A1 | * | 12/2002 | Fukuda et al. | 429/231.4 |
| 2009/0123850 A1 | * | 5/2009 | Takeuchi et al. | 429/342 |
| 2012/0021294 A1 | * | 1/2012 | Zhamu et al. | 429/231.8 |

FOREIGN PATENT DOCUMENTS

| | | |
|---|---|---|
| JP | 2009-117257 A | 5/2009 |
| JP | 2010-165580 A | 7/2010 |
| JP | 4738553 B2 | 8/2011 |
| WO | 2011/049199 A1 | 4/2011 |

OTHER PUBLICATIONS

Park et al., In situ XRD study of the structural changes of graphite anodes mixed with SiOx during lithium insertion and extraction in lithium ion batteries, Electrochimica Acta 107 (2013) 467-472, Available online Jun. 26, 2013.*

(Continued)

*Primary Examiner* — Patrick Ryan
*Assistant Examiner* — Jose Colucci Rios
(74) *Attorney, Agent, or Firm* — Sughrue Mion, PLLC

(57) ABSTRACT

By a method that includes coking a residue resulting from distillation of crude oil under reduced pressure and having API gravity of 1 to 5, an asphaltene content of 10 to 50%, a resin content of 5 to 30%, and a sulfur content of 1 to 12% to obtain coke, pulverizing the coke to obtain a carbon powder, and heating the carbon powder at 1000 to 3500 deg C., a graphite anode active material for use in a lithium secondary battery is obtained that has, in X-ray powder diffraction, $d_{002}$ of not smaller than 0.3354 nm and not greater than 0.337 nm, Lc(004) of smaller than 100 nm, La(110) of not smaller than 100 nm, and a half width of the peak of a plane (101) at a diffraction angle (2θ) of 44 degrees to 45 degrees of not smaller than 0.65 degree.

17 Claims, 1 Drawing Sheet

(56) References Cited

OTHER PUBLICATIONS

Yang et al. Facile synthesis of mesophase pitch/exfoliated graphite nanoplatelets nanocomposite and its application as anode materials for lithium-ion batteries, Journal of Solid State Chemistry 183 (2010) 2116-2120, Available on line Jul. 15, 2010.*

International Search Report for PCT/JP2011/004453 dated Nov. 22, 2011.

* cited by examiner

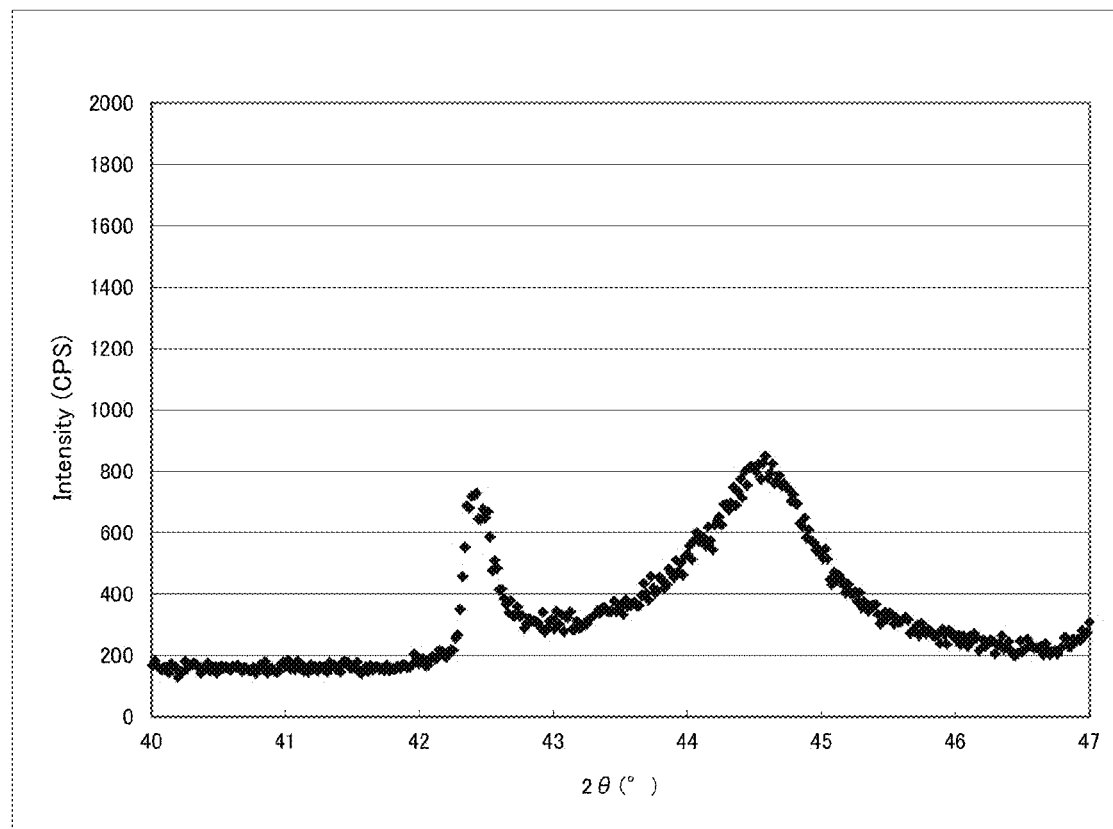

GRAPHITE ANODE ACTIVE MATERIAL FOR USE IN LITHIUM SECONDARY BATTERY

CROSS REFERENCE TO RELATED APPLICATIONS

This application is a National Stage of International Application No. PCT/JP2011/004453 filed Aug. 5, 2011, claiming priority based on Japanese Patent Application No. 2010-176783 filed Aug. 5, 2010, the contents of all of which are incorporated herein by reference in their entirety.

TECHNICAL FIELD

The present invention relates to a graphite anode active material for use in a lithium secondary battery, an anode for use in a lithium secondary battery, and a lithium secondary battery. More specifically, the present invention relates to a graphite anode active material for use in a lithium secondary battery that maintains excellent charge-discharge cycle characteristics even when highly packed for increasing capacitance, an anode for use in a lithium secondary battery comprising the graphite anode active material for use in a lithium secondary battery, and a lithium secondary battery comprising the anode for use in a lithium secondary battery. The lithium secondary battery in one embodiment of the present invention includes a lithium-ion capacitor.

BACKGROUND ART

Lithium secondary batteries are largely used as power supplies in portable devices and the like. Diversification in the functions of portable devices and the like has led to the growth in power consumption. This has been prompting demands for an increase in the capacitance and improvement in the charge-discharge cycle characteristics of lithium secondary batteries. In a lithium secondary battery, usually, a lithium salt such as lithium cobaltate serves as a cathode active material and graphite and/or the like serve as an anode active material.

Capacitance can be increased by enhancing the electrode packing density of a carbonaceous material used in an anode. When an electrode packing density is enhanced using a conventional carbonaceous material, however, deformation and/or the like of the carbonaceous material may occur to lead to significant degradation of charge-discharge cycle characteristics.

Because of this, studies are conducted to improve a carbonaceous material itself for use in an anode so as to increase capacitance and improve charge-discharge cycle characteristics. For example, Patent Document 1 and Patent Document 2 describe composite graphite having a particular crystal structure. Patent Document 3 describes combined use of graphite having a particular crystal structure and a vapor grown carbon fiber having a particular crystal structure. Patent Document 4 describes a carbon composite material that is obtained by adhering an organic compound serving as a polymer raw material to carbonaceous particles such as graphite particles, polymerizing the organic compound, and then heating it at 1800 to 3300 deg C.

Patent Document 1: JP 2007-141677 A
Patent Document 2: WO 2007/072858 A
Patent Document 3: JP 2007-42620 A
Patent Document 4: JP 2005-158718 A

SUMMARY OF THE INVENTION

Problems to be Resolved by the Invention

The carbonaceous materials disclosed in these Patent Documents have improved the capacitance and the charge-discharge cycle characteristics of a lithium secondary battery. However, as requirements on the performance of a lithium secondary battery grow year after year, further improvement is desired in a carbonaceous material for use in an anode for use in a lithium secondary battery.

A object of the present invention is to provide a graphite anode active material for use in a lithium secondary battery that has large capacitance and maintains excellent charge-discharge cycle characteristics even when highly packed, an anode for use in a lithium secondary battery comprising the anode active material, and a lithium secondary battery comprising the anode.

Means for Solving the Problems

The present inventors have conducted intensive research to achieve these objects and, as a result, found a novel graphite anode active material for use in a lithium secondary battery where the numerical values of the interplanar spacing, the crystallite size, and the half width of the diffraction peak, measured by X-ray diffraction, fall within particular ranges. The present inventors also found that a lithium secondary battery that comprises the anode active material in the anode has large capacitance and maintains excellent charge-discharge cycle characteristics even when highly packed with the anode active material. The present inventors have conducted further studies based on these findings and have now completed the present invention.

Thus, the present invention includes the following embodiments.

[1] a graphite anode active material for use in a lithium secondary battery, in which the graphite anode active material can be, according to X-ray powder diffraction,
  not smaller than 0.3354 nm and not greater than 0.337 nm in $d_{002}$,
  smaller than 100 nm in Lc(004),
  not smaller than 100 nm in La(110), and
  not smaller than 0.65 degree in a half width of the peak of a plane (101) at a diffraction angle (2θ) of 44 degrees to 45 degrees.

[2] the graphite anode active material for use in a lithium secondary battery according to [1] in which the ratio I(100)/I(101) of peak intensity in X-ray powder diffraction can be not lower than 0.7 and not higher than 1.

[3] the graphite anode active material for use in a lithium secondary battery according to [1] or [2] in which a layer can have a ratio I(110)/I(004) of peak intensity of not lower than 0.2 measured by X-ray diffraction, the layer having density of not lower than 1.5 g/cm$^3$ and not higher than 1.6 g/cm$^3$ formed by applying a mixture of the anode active material and a binder to copper foil to be subjected to drying and pressure molding.

[4] the graphite anode active material for use in a lithium secondary battery according to any one of [1] to [3] in which a BET specific surface area can be not greater than 5 m$^2$/g and $D_{50}$ referring to a volume average particle diameter can be not smaller than 3 μm and not greater than 30 μm.

[5] the graphite anode active material for use in a lithium secondary battery according to any one of [1] to [4] in which a half width of the peak of a plane (101) at a diffraction angle (2θ) of 44 degrees to 45 degrees in X-ray powder diffraction can be not smaller than 0.65 degree and not greater than 2 degrees.

[6] the graphite anode active material for use in a lithium secondary battery according to any one of [1] to [5] in which the graphite anode active material can be surface-treated.

[7] the graphite anode active material for use in a lithium secondary battery according to any one of [1] to [5] in which the graphite anode active material can be surface-treated with pitch having a softening point of 200 to 350 deg C. and a fixed carbon content of 50 to 80% by mass.

[8] the graphite anode active material for use in a lithium secondary battery according to [7] in which the $D_{50}$ referring to the volume average particle diameter of the pitch can be 1 μm to 10 μm.

[9] the graphite anode active material for use in a lithium secondary battery according to [7] in which the pitch can be optically isotropic.

[10] a method for producing the graphite anode active material for use in the lithium secondary battery according to any one of [1] to [9] which comprises:

coking a residue resulting from distillation of crude oil under reduced pressure and having API gravity of 1 to 5, an asphaltene content of 10 to 50%, a resin content of 5 to 30%, and a sulfur content of 1 to 12% to obtain coke, pulverizing the coke to obtain a carbon powder, and heating the carbon powder at 1000 to 3500 deg C.

[11] the method according to [10] which further comprises performing surface treatment by mechanofusion or a wet process.

[12] the method according to [10] or [11] in which the water content of the coke is not higher than 1.0%.

[13] an anode for use in a lithium secondary battery which comprises the graphite anode active material for use in a lithium secondary battery according to any one of [1] to [9].

[14] the anode for use in a lithium secondary battery according to [13] which further comprises a vapor grown carbon fiber with a fiber diameter of not smaller than 5 nm and not larger than 0.2 μm.

[15] a lithium secondary battery which comprises the anode for use in a lithium secondary battery according to [13] or [14].

[16] the lithium secondary battery according to [15] which comprises at least one solvent selected from the group consisting of ethylene carbonate, diethyl carbonate, dimethyl carbonate, methylethyl carbonate, propylene carbonate, butylene carbonate, ganma-butyrolactone, and vinylene carbonate.

[17] a transportation which comprises the lithium secondary battery according to [15] or [16].

[18] a power-generating system which comprises the lithium secondary battery according to [15] or [16].

[19] an electrical or electronic equipment which comprises the lithium secondary battery according to [15] or [16].

Advantageous Effect of the Invention

A lithium secondary battery that comprises the graphite anode active material for use in a lithium secondary battery of the present invention in the anode has large capacitance and maintains excellent charge-discharge cycle characteristics even when highly packed with the graphite anode active material.

BRIEF DESCRIPTION OF THE DRAWINGS

FIG. 1 shows the X-ray powder diffraction of a graphite anode active material for use in a lithium battery in one embodiment of the present invention that is obtained in Example 1.

EMBODIMENTS FOR CARRYING OUT THE INVENTION

1) Graphite Anode Active Material for Use in Lithium Secondary Battery

A graphite anode active material for use in a lithium secondary battery in one embodiment of the present invention, according to X-ray powder diffraction, has $d_{002}$ of not smaller than 0.3354 nm and not greater than 0.337 nm, and preferably not smaller than 0.3359 nm and not greater than 0.3368 nm. $d_{002}$ indicates the crystallinity of graphite.

$d_{002}$ is interplanar spacing calculated from the 002 diffraction peak of graphite powder and the Bragg equation $d=\lambda/\sin\theta c$.

The anode active material in one embodiment of the present invention, according to X-ray powder diffraction, is smaller than 100 nm, and preferably not smaller than 40 nm and not greater than 85 nm in Lc(004). The anode active material in one embodiment of the present invention, according to X-ray powder diffraction, is not smaller than 100 nm in La(110).

Lc(004) is the thickness of a crystallite in a c-axis direction calculated from the 004 diffraction peak of graphite powder. La(110) is the width of a crystallite in an a-axis direction calculated from the 110 diffraction peak of graphite powder.

The anode active material in one embodiment of the present invention, according to X-ray powder diffraction, has $B_{101}$ referring to the half width of the peak of a plane (101) at a diffraction angle (2θ) of 44 degrees to 45 degrees of not smaller than 0.65 degree, preferably not smaller than 0.65 degree and not greater than 2 degrees, and more preferably not smaller than 0.7 degree and not greater than 1.5 degrees.

When the $B_{101}$ referring to the half width of the peak of a plane (101) is not smaller than 0.65 degree, the peak is relatively broad. A broad peak is assumed to indicate that the ABA-stacked structure of a graphite crystal is disordered. It is known that an ABA-stacked structure is transformed into an AAA-stacked structure when a lithium ion is inserted into a graphite layer. When the ABA-stacked structure is disordered, transformation of the stacked structure of graphite at the time of lithium ion insertion is speculated to occur at lower energy.

The anode active material in one embodiment of the present invention, according to X-ray powder diffraction, has the ratio I(100)/I(101) of the peak intensity of preferably not higher than 1, more preferably not lower than 0.7 and not higher than 1, and further preferably not lower than 0.75 and not higher than 0.95.

In the anode active material in one embodiment of the present invention, a mixture layer with density of not lower than 1.5 g/cm³ and not higher than 1.6 g/cm³ formed by applying a mixture of the anode active material and a binder to copper foil to be subjected to drying and pressure molding has a ratio I(110)/I(004) of the peak intensity that is preferably not lower than 0.2 and is more preferably higher than 0.35 and not higher than 0.9 measured by X-ray diffraction. The ratio I(110)/I(004) of the peak intensity thus measured indicates the orientation of graphite powder. The greater the ratio I(110)/I(004) is, the lower the orientation is.

The BET specific surface area of the anode active material in one embodiment of the present invention is preferably not greater than 5 m²/g and is more preferably 1 to 4.5 m²/g. When the BET specific surface area is not greater than 5 m²/g, an undesirable side reaction with an electrolyte solution is less prone to proceed, and deterioration in charge-discharge cycle characteristics is less prone to proceed.

The $D_{50}$ referring to the volume average particle diameter of the anode active material in one embodiment of the present invention is preferably not smaller than 3 μm and not greater than 30 μm, is more preferably not smaller than 4 μm and not greater than 25 μm, and is further preferably not smaller than 4 μm and not greater than 20 μm. When the $D_{50}$ referring to the volume average particle diameter is within the range, the surface of an electrode is smooth and an undesirable side reaction with an electrolyte solution is less prone to proceed.

The anode active material in one embodiment of the present invention can be obtained, for example, by the following method.

First, crude oil of Venezuelan origin is distilled under reduced pressure to obtain a residue. The residue has the API gravity of preferably 1 to 5, the asphaltene content of preferably 10 to 50%, the resin content of preferably 5 to 30%, and the sulfur content of preferably 1 to 12%.

The residue is coked to obtain coke. A coking method may be delayed coking or fluid coking. The resulting coke is cut out with water and is heated, followed by drying to achieve a water content of preferably not higher than 1.0%.

The dried coke lump is pulverized and is classified to obtain a carbon powder. A pulverizing method is not particularly limited, and examples thereof include a method using an apparatus such as a hammer mill, a pin mill, a jet mill, a rod mill, and an ACM pulverizer. The $D_{50}$ referring to the volume average particle diameter of the carbon powder after classification is preferably not smaller than 3 μm and not greater than 30 μm, is more preferably not smaller than 4 μm and not greater than 25 μm, and is further preferably not smaller than 4 μm and not greater than 20 μm.

The carbon powder is heated preferably at 1000 to 3500 deg C., more preferably at 2000 to 3400 deg C., and further preferably at 2500 to 3300 deg C. so as to be converted into graphite. Thus, the anode active material in one embodiment of the present invention can be obtained.

The anode active material in one embodiment of the present invention may be surface-treated. Examples of the surface treatment include surface fusion by mechanofusion or a similar method, surface coating by a wet process or a similar method, and the like.

The wet process is, for example, a method described in JP 2005-158718 A, and is specifically a method comprising adhering an organic compound serving as a polymer raw material to the surface of the anode active material and/or impregnating the surface of the anode active material with an organic compound serving as a polymer raw material, polymerizing the organic compound, and heating it at 1800 to 3300 deg C., or a method comprising adhering a solution of a resin material to the surface of the anode active material and/or impregnating the surface of the anode active material with a solution of a resin material, drying, and heating at 1800 to 3300 deg C.

Mechanofusion is, for example, a method comprising placing the anode active material and different species of carbon materials or resin materials in equipment for fast rotation mixing, applying mechanical energy to the anode active material and the different species of carbon materials or resin materials to cause a mechanochemical reaction, and, where appropriate, performing heating at 900 deg C. to 2000 deg C. In the present invention, surface treatment with mechanofusion is preferable.

In the surface treatment of the anode active material, a carbon material such as petroleum pitch, coal pitch, and coal tar and/or a resin material such as phenol resins and furan resins is (are) used. Petroleum pitch and coal pitch are optically isotropic or optically anisotropic. In examples of the present specification, an optically isotropic one is used. The pitch used in the surface treatment has the softening point of preferably 200 to 350 deg C., the fixed carbon content of preferably 50 to 80% by mass, and the $D_{50}$ referring to the volume average particle diameter of preferably 1 μm to 10 μm. The amount of the pitch used in the surface treatment is preferably 0.1 to 50 parts by mass and is more preferably 0.1 to 10 parts by mass relative to 100 parts by mass of the anode active material.

The graphite anode active material for use in a lithium secondary battery in one embodiment of the present invention may be composed of one species of carbonaceous material or may be composed of a plurality of different species of carbonaceous materials, provided that it satisfies the above characteristic values.

2) Anode for Use in Lithium Secondary Battery

An anode for use in a lithium secondary battery in one embodiment of the present invention comprises the anode active material in one embodiment of the present invention.

In the anode for use in a lithium secondary battery, the anode active material is usually in an anode active material layer. The anode active material layer is formed, by various methods, of a mixture of the anode active material, a binder, and an additive that is compounded where appropriate. The anode active material layer usually has a collector stacked thereon for facilitating energization with a terminal, a conductive wire, and the like.

Examples of the binder include polyethylenes, polypropylenes, ethylene-propylene terpolymers, butadiene rubber, styrene-butadiene rubber, butyl rubber, polytetrafluoroethylene, poly(meth)acrylates, polyvinylidene fluoride, polyethylene oxide, poly(propylene oxide), polyepichlorohydrin, polyphosphazenes, polyacrylonitrile, and the like.

Examples of the additive that is compounded in the anode active material layer where appropriate include a conductive additive, an ion-permeable compound, a thickener, a dispersant, a lubricant, active carbon, and the like.

Examples of the conductive additive include conductive metal powders such as a silver powder; powders of conductive carbon such as furnace black, Ketjenblack, and acetylene black; a carbon nanotube, a carbon nanofiber, a vapor grown carbon fiber, and the like. The anode in one embodiment of the present invention preferably comprises a vapor grown carbon fiber as the additive. The fiber diameter of the vapor grown carbon fiber is preferably not smaller than 5 nm and not larger than 0.2 μm. The content of the vapor grown carbon fiber is preferably 0.1 to 10% by mass relative to the mass of the anode active material layer. Examples of the ion-permeable compound include polysaccharides such as chitin and chitosan, crosslinked products of the polysaccharides, and the like. Examples of the thickener include carboxymethylcellulose, polyvinyl alcohol, and the like.

The anode active material layer is obtained, for example, by applying the mixture in paste form to the collector, followed by drying and performing pressure molding, or by pressure molding of the mixture in granular form on the collector. The thickness of the anode active material layer is usually not smaller than 0.04 mm and not greater than 0.15 mm. The pressure to be applied at the time of formation can be adjusted so as to obtain an anode active material layer of any electrode density. The pressure to be applied at the time of formation is preferably about 1 $t/cm^2$ to 3 $t/cm^2$.

Examples of the collector include conductive metal foil, a conductive metal mesh, perforated plate of a conductive metal, and the like. The conductive metal used contains copper, aluminum, nickel, and/or the like. The collector used in the anode preferably contains copper.

3) Lithium Secondary Battery

A lithium secondary battery in one embodiment of the present invention comprises the anode for use in a lithium secondary battery in one embodiment of the present invention. The lithium secondary battery in one embodiment of the present invention includes a lithium-ion capacitor.

The lithium secondary battery in one embodiment of the present invention further comprises a cathode. As the cathode, one that is conventionally used in a lithium secondary battery can be used. The cathode usually comprises a cathode active material layer comprising a cathode active material and a collector stacked on the cathode active material layer. Examples of the cathode active material include $LiNiO_2$, $LiCoO_2$, $LiMn_2O_4$, and the like. The cathode active material layer may further comprise a conventionally known cathode active material additive. The collector used in the cathode preferably contains aluminum.

In the lithium secondary battery, the cathode and the anode are usually immersed in an electrolyte. The electrolyte may be liquid, gel, or solid.

Examples of the liquid electrolyte include a solution of a lithium salt in a nonaqueous solvent. Examples of the lithium salt include $LiClO_4$, $LiPF_6$, $LiAsF_6$, $LiBF_4$, $LiSO_3CF_3$, $CH_3SO_3Li$, $CF_3SO_3Li$, and the like. The nonaqueous solvent in the liquid electrolyte is preferably at least one selected from the group consisting of ethylene carbonate, diethyl carbonate, dimethyl carbonate, methylethyl carbonate, propylene carbonate, butylene carbonate, ganma-butyrolactone, and vinylene carbonate.

Examples of the solid electrolyte or the gel electrolyte include polymer electrolytes such as sulfonated styrene-olefin copolymers, polymer electrolytes comprising polyethylene oxide and $MgClO_4$, polymer electrolytes having a trimethylene oxide structure, and the like. The nonaqueous solvent in the polymer electrolytes is preferably at least one selected from the group consisting of ethylene carbonate, diethyl carbonate, dimethyl carbonate, methylethyl carbonate, propylene carbonate, butylene carbonate, ganma-butyrolactone, and vinylene carbonate.

A separator is provided, where appropriate, between the cathode and the anode. Examples of the separator include a nonwoven fabric, a woven fabric, a microporous film, and the like, and a combination thereof, etc.

The lithium secondary battery in one embodiment of the present invention has applications in various fields. Examples thereof include electrical and electronic equipment such as personal computers, tablet computers, laptop computers, cellular phones, radios, personal organizers, electronic dictionaries, PDAs (Personal Digital Assistants), electric meters, electronic keys, electronic tags, power storage devices, electric tools, toys, digital cameras, digital videos, AV systems, and vacuum cleaners; transportation such as electric vehicles, hybrid vehicles, electric motorcycles, hybrid motorcycles, electric bicycles, electric power-assisted bicycles, railcars, aircrafts, and ships; power-generating systems such as solar power systems, wind power systems, tidal power systems, and geothermal power systems; and the like.

EXAMPLES

The present invention is described more specifically by examples. The scope of the present invention is, however, not limited to these examples.

The physical properties of a graphite anode active material for use in a lithium secondary battery were measured by the following methods.

"$d_{002}$, Lc(004), La(110), I(100)/I(101), and $B_{101}$"

The measurement was performed by X-ray powder diffraction. $d_{002}$ is interplanar spacing calculated from a 002 diffraction peak and the Bragg equation $d=\lambda/\sin\theta c$. Lc(004) is the thickness of a crystallite in a c-axis direction calculated using a 004 diffraction peak. La(110) is the width of a crystallite in an a-axis direction calculated using a 110 diffraction peak. I(100)/I(101) is the ratio of the peak intensity of a 100 diffraction peak to the peak intensity of a 101 diffraction peak. $B_{101}$ is the half width of the 101 diffraction peak at a diffraction angle (2θ) of 44 degrees to 45 degrees.

"Orientation, I(110)/I(004)"

Polyvinylidene fluoride (L#9130; n-methyl-2-pyrrolidone solution) manufactured by KUREHA CORPORATION was added to an anode active material by a small amount at a time to achieve a solid content of 5% by mass while kneading. N-methyl-2-pyrrolidone was added thereto, and the resultant was kneaded to achieve adequate fluidity. Kneading was performed at 500 rpm for 5 minutes with an NBK-1, which is a defoaming kneader manufactured by Nissei Corp., to obtain the mixture in paste form. The mixture was applied to copper foil using an automatic coater and a doctor blade with a clearance of 250 μm.

The copper foil to which the mixture was applied was placed on a hot plate at about 80 deg C. to get rid of water. Drying was then performed in a vacuum dryer at 120 deg C. for 6 hours. After drying, pressure molding was performed with a press machine so as to achieve an electrode density that is calculated from the mass of the solid content in the mixture and the dry volume of the coating of not lower than 1.5 g/cm$^3$ and not higher than 1.6 g/cm$^3$, thereby obtaining an electrode sheet composed of stacked layers of the mixture and the copper foil. The electrode sheet was cut out into an appropriate size and was affixed to a glass cell for X-ray diffraction measurement, followed by X-ray diffraction measurement. The ratio I(110)/I(004) of peak intensity was then calculated, which indicates the orientation of graphite.

"BET Specific Surface Area, $S_{sa}$"

Specific surface area was calculated from the analysis through the use of the BET method using nitrogen adsorption.

"Volume Average Particle Diameter, $D_{50}$"

Two microspatulafuls of graphite and two drops of a nonionic surfactant (Triton-X) were added to 50 ml of water, followed by ultrasonic dispersion for 3 minutes. The dispersion was placed in a laser diffraction particle size analyzer (Mastersizer) manufactured by Malvern Instruments Ltd. so as to measure particle size distribution, thereby determining $D_{50}$ referring to a volume average particle diameter.

Example 1

Production of Graphite A1

Crude oil of Venezuelan origin was distilled under reduced pressure to obtain a residue. The residue had API gravity of 2.3, an asphaltene content of 25%, a resin content of 15%, and a sulfur content of 6.0%. The residue was placed in a delayed coker for coking to obtain coke. The resulting coke was cut out with water and was heated at 120 deg C., followed by drying to achieve a water content of not higher than 1.0%.

The dried coke lump was pulverized with a hammer mill manufactured by Hosokawa Micron Corporation, followed by air classification by a Turbo Classifier, TC-15N manufactured by Nisshin Engineering Inc., to obtain a carbon powder having $D_{50}$ referring to a volume average particle diameter of 17 μm.

The carbon powder was packed into a graphite crucible, followed by heating in an Acheson furnace at 3200 deg C. to obtain graphite A1. The physical properties are shown in Table 1. The X-ray powder diffraction of the graphite A1 is shown in FIG. 1.

Example 2

Production of Graphite B1

Graphite B1 was obtained in the same manner as in Example 1 except that air classification was performed to obtain a carbon powder having $D_{50}$ referring to a volume average particle diameter of 5 μm, which was used instead of the carbon powder having $D_{50}$ referring to a volume average particle diameter of 17 μm. The physical properties are shown in Table 1.

Example 3

Production of Graphite A2

Five parts by mass of optically isotropic petroleum pitch having a softening point of about 275 deg C., a fixed carbon content of 65% by mass, and $D_{50}$ referring to a volume average particle diameter of 5 μm was mixed with 95 parts by mass of the graphite A1. The mixture was placed in a mechanofusion system manufactured by Hosokawa Micron Corporation and was subjected to a fast rotation. The resultant was heated at 1200 deg C. for 1 hour in a nitrogen gas atmosphere. After cooling, the resultant was passed through a sieve with an aperture of 45 μm to obtain graphite A2. Mechanofusion is a technique of applying a type of mechanical energy to particles of a plurality of different materials to cause a mechanochemical reaction so as to create a new material. The physical properties are shown in Table 1.

Example 4

Production of Graphite B2

Graphite B2 was obtained in the same manner as in Example 3 except that the graphite B1 was used instead of the graphite A1. The physical properties are shown in Table 1.

Comparative Example 1 to Comparative Example 4

For Comparative Examples, spherical natural graphite (hereinafter, referred to as graphite C1), mesophase carbon (hereinafter, referred to as graphite D), and scale-like artificial graphite (hereinafter, referred to as graphite E), all of which are commercially available products, were prepared.

Graphite C2 was obtained in the same manner as in Example 3 except that the graphite C1 was used instead of the graphite A1. The physical properties are shown in Table 1.

TABLE 1

| | Graphite* | $d_{002}$ (nm) | Crystal structure | | | | Orientation | | $S_{sa}$ (m$^2$/g) | $D_{50}$ (μm) |
| | | | Lc(004) (nm) | La(110) (nm) | $B_{101}$ (degree) | I(100)/I(101) | I(110)/I(004) | | | |
| --- | --- | --- | --- | --- | --- | --- | --- | --- | --- | --- |
| Ex. 1 | A1 | 0.3360 | 80 | >100 | 1.0 | 0.85 | 0.75 | 1.5 | 17 | |
| Ex. 2 | B1 | 0.3367 | 60 | >100 | 0.7 | 0.86 | 0.48 | 4.0 | 5 | |
| Ex. 3 | A2 | 0.3363 | 75 | >100 | 1.0 | 0.85 | 0.64 | 1.2 | 17 | |
| Ex. 4 | B2 | 0.3367 | 60 | >100 | 0.65 | 0.86 | 0.40 | 2.8 | 5 | |
| Comp. Ex. 1 | C1 | 0.3354 | >100 | >100 | 0.4 | 0.37 | 0.09 | 5.6 | 22 | |
| Comp. Ex. 2 | C2 | 0.3355 | >100 | >100 | 0.4 | 0.37 | 0.12 | 4.4 | 20 | |
| Comp. Ex. 3 | D | 0.3363 | 90 | >100 | 0.6 | 0.61 | 0.35 | 0.9 | 22 | |
| Comp. Ex. 4 | E | 0.3354 | >100 | >100 | 0.2 | 0.54 | 0.001 | 4.5 | 24 | |

*C1 is spherical natural graphite, C2 is a surface-treated product of the spherical natural graphite, D is mesophase carbon, and E is scale-like artificial graphite. A1, B1, A2, and B2 are graphite produced in Examples 1, 2, 3, and 4, respectively.

Examples 5 to 8 and Comparative Examples 5 to 8

Each graphite prepared in Examples 1 to 4 and Comparative Examples 1 to 4 was used as an anode active material.

A lithium secondary battery was produced using the anode active material by the following method, followed by measurement of discharge capacitance retention (%) after 200th charge-discharge cycles. The results are shown in Table 2.

"Production of Lithium Secondary Battery"

The following process was carried out in a glove box maintained in a dry argon gas atmosphere with a dew point of not higher than −80 deg C.

N-methyl-2-pyrrolidone was added to 95 parts by mass of lithium cobaltate (C-10, cathode active material manufactured by Nippon Chemical Industrial Co., Ltd.), 3 parts by mass of a binder (polyvinylidene fluoride: PVDF), and 5 parts by mass of a conductive material (acetylene black) to obtain a mixture in slurry form. The mixture was applied to aluminum foil of 25-μm thick. The aluminum foil to which the mixture was applied was dried in a vacuum dryer at 120 deg C. for 6 hours. After drying, pressure molding was performed with a press machine so as to achieve an electrode density that is calculated from the mass of the solid content in the mixture and the dry volume of the coating of about 3.5 g/cm$^3$, thereby obtaining a cathode. As an anode, an electrode sheet fabricated in evaluation of orientation was used.

In an SUS304 cylindrical container, a spacer, a leaf spring, the anode, a separator (polypropylene microporous film "Celgard 2400" manufactured by Celgard Corporation), and the cathode were stacked in this order. An SUS304 cylindrical top cover was placed thereon. The container and the top cover were crimped together with a coin cell crimper to obtain a coin cell for evaluation. Five coin cells were fabricated for each anode active material to be subjected to an evaluation test.

"Discharge Capacitance Retention (%) after 200th Cycle"

The coin cells were subjected to the following charge-discharge test at constant current and constant voltage.

The 1st and 2nd cycles were conducted as follows. Charging was performed at constant current of 0.17 mA/cm$^2$ starting at resting potential to 4.2 V, and from the point when 4.2 V was reached, charging was performed at constant voltage of 4.2 V. Charging was then paused when the current value decreased to 25.4 μA. Discharging was performed at constant current of 0.17 mA/cm$^2$, followed by cutting off at voltage of 2.7 V.

The 3rd and later cycles were conducted as follows.

Charging was performed at constant current of 0.34 mA/cm$^2$ (equivalent to 0.2 C) starting at resting potential to 4.2 V, and from the point when 4.2 V was reached, charging was performed at constant voltage of 4.2 V. Charging was then paused when the current value decreased to 20 μA. Discharging was performed at constant current of 1.7 mA/cm$^2$ (equivalent to 1.0 C), followed by cutting off at voltage of 2.7 V.

The proportion of the discharge capacitance after 200th cycle to the discharge capacitance after 3rd cycle was determined. This was performed for the five coin cells, and the average value was determined to serve as "discharge capacitance retention (%) after 200th cycle".

TABLE 2

Tab. 2

| | Anode active material | Discharge capacitance retention (%) after 200th cycle |
|---|---|---|
| Ex. 5 | Graphite A1 | 85 |
| Ex. 6 | Graphite B1 | 83 |
| Ex. 7 | Graphite A2 | 86 |
| Ex. 8 | Graphite B2 | 87 |
| Comp. Ex. 5 | Graphite C1 | 52 |
| Comp. Ex. 6 | Graphite C2 | 62 |
| Comp. Ex. 7 | Graphite D | 43 |
| Comp. Ex. 8 | Graphite E | 33 |

As shown in Table 2, the graphite anode active material for use in a lithium secondary battery in one embodiment of the present invention was found to give a lithium secondary battery with excellent charge-discharge cycle characteristics.

The invention claimed is:

1. A graphite anode active material for use in a lithium secondary battery wherein the graphite anode active material is, according to X-ray powder diffraction,
   not smaller than 0.3354 nm and not greater than 0.337 nm in $d_{002}$,
   smaller than 100 nm in Lc(004),
   not smaller than 100 nm in La(110), and
   not smaller than 0.65 degree in a half width of the peak of a plane (101) at a diffraction angle (2θ) of 44 degrees to 45 degrees.

2. The graphite anode active material for use in a lithium secondary battery according to claim 1 wherein a ratio I(100)/I(101) of peak intensity in X-ray powder diffraction is not lower than 0.7 and not higher than 1.

3. The graphite anode active material for use in a lithium secondary battery according to claim 1 wherein a layer has a ratio I(110)/I(004) of peak intensity of not lower than 0.2 measured by X-ray diffraction, the layer having density of not lower than 1.5 g/cm$^3$ and not higher than 1.6 g/cm$^3$ formed by applying a mixture of the anode active material and a binder to copper foil to be subjected to drying and pressure molding.

4. The graphite anode active material for use in a lithium secondary battery according to claim 1 wherein a BET specific surface area is not greater than 5 m$^2$/g and $D_{50}$ referring to a volume average particle diameter is not smaller than 3 μm and not greater than 30 μm.

5. The graphite anode active material for use in a lithium secondary battery according to claim 1 wherein a half width of the peak of a plane (101) at a diffraction angle (2θ) of 44 degrees to 45 degrees in X-ray powder diffraction is not smaller than 0.65 degree and not greater than 2 degrees.

6. The graphite anode active material for use in a lithium secondary battery according to claim 1 wherein the graphite anode active material is surface-treated.

7. The graphite anode active material for use in a lithium secondary battery according to claim 1 wherein the graphite anode active material is surface-treated with pitch having a softening point of 200 to 350 deg C. and a fixed carbon content of 50 to 80% by mass.

8. The graphite anode active material for use in a lithium secondary battery according to claim 7 wherein $D_{50}$ referring to a volume average particle diameter of the pitch is 1 μm to 10 μm.

9. The graphite anode active material for use in a lithium secondary battery according to claim 7 wherein the pitch is optically isotropic.

10. A method for producing the graphite anode active material for use in the lithium secondary battery according to claim 1 comprising:
    coking a residue resulting from distillation of crude oil under reduced pressure and having API gravity of 1 to 5, an asphaltene content of 10 to 50%, a resin content of 5 to 30%, and a sulfur content of 1 to 12% to obtain coke,
    pulverizing the coke to obtain a carbon powder, and
    heating the carbon powder at 1000 to 3500 deg C.

11. The method according to claim 10 further comprising performing surface treatment by mechanofusion or a wet process.

12. The method according to claim 10 wherein a water content of the coke is not higher than 1.0%.

13. An anode for use in a lithium secondary battery comprising the graphite anode active material for use in a lithium secondary battery according to claim 1.

14. The anode for use in a lithium secondary battery according to claim 13 further comprising a vapor grown carbon fiber with a fiber diameter of not smaller than 5 nm and not larger than 0.2 μm.

15. A lithium secondary battery comprising the anode for use in a lithium secondary battery according to claim 13.

16. The lithium secondary battery according to claim 15 comprising at least one solvent selected from a group consisting of ethylene carbonate, diethyl carbonate, dimethyl carbonate, methylethyl carbonate, propylene carbonate, butylene carbonate, ganma-butyrolactone, and vinylene carbonate.

17. A transportation, a power-generating system, or an electrical or electronic equipment comprising the lithium secondary battery according to claim 15.

* * * * *